US011758095B2

(12) United States Patent
Lee

(10) Patent No.: US 11,758,095 B2
(45) Date of Patent: Sep. 12, 2023

(54) SYSTEM FOR PROVIDING SHARED CONTENTS SERVICE USING REMOTE CONTROLLING OF SHARED AUTONOMOUS DEVICE

(71) Applicants: INTEGRIT INC., Seoul (KR); Chang Seok Lee, Uiwang-si (KR)

(72) Inventor: Chang Seok Lee, Uiwang-si (KR)

(73) Assignees: INTEGRIT INC., Seoul (KR); Chang Seok Lee, Uiwang-si (KR)

( * ) Notice: Subject to any disclaimer, the term of this patent is extended or adjusted under 35 U.S.C. 154(b) by 0 days.

(21) Appl. No.: 17/915,491

(22) PCT Filed: Jun. 15, 2021

(86) PCT No.: PCT/KR2021/007494
§ 371 (c)(1),
(2) Date: Sep. 29, 2022

(87) PCT Pub. No.: WO2021/256835
PCT Pub. Date: Dec. 23, 2021

(65) Prior Publication Data
US 2023/0120276 A1 Apr. 20, 2023

(30) Foreign Application Priority Data
Jun. 17, 2020 (KR) .......................... 10-2020-0073663

(51) Int. Cl.
*G06N 20/00* (2019.01)
*H04N 7/18* (2006.01)
*G06Q 30/0601* (2023.01)

(52) U.S. Cl.
CPC ............. *H04N 7/185* (2013.01); *G06N 20/00* (2019.01); *G06Q 30/0601* (2013.01)

(58) Field of Classification Search
CPC ............. G01C 21/3484; G05D 1/0055; G05D 1/0094; G05D 1/0077; G05D 1/0088;
(Continued)

(56) References Cited

U.S. PATENT DOCUMENTS

| 7,949,616 B2* | 5/2011 | Levy | H04N 7/185 |
| | | | 706/11 |
| 10,063,815 B1* | 8/2018 | Spivey | H04N 7/185 |

(Continued)

FOREIGN PATENT DOCUMENTS

| KR | 10-2016-0074897 A | 6/2016 |
| KR | 10-2018-0042062 A | 4/2018 |

(Continued)

OTHER PUBLICATIONS

International Search Report for PCT/KR2021/007494 dated Sep. 30, 2021 from Korean Intellectual Property Office.

*Primary Examiner* — Gerald Gauthier
(74) *Attorney, Agent, or Firm* — Revolution IP, PLLC

(57) ABSTRACT

A system for providing a shared contents service using remote controlling of a shared autonomous device, includes: at least one shared autonomous device unit having driving, shooting, sensing and communication functions via an Internet communication network; a license transaction unit selling a license for the shared autonomous device unit, and delegating the sold license to a purchaser; a system connection unit processing the system connection of a license purchaser communication terminal by using the license delegated through the license transaction unit; a remote control unit receiving a control instruction signal of the shared autonomous device unit from the license purchaser communication terminal remotely connected through the system connection unit, and instructing to execute autonomous driving of the shared autonomous device unit according to the received control instruction signal; and a contents (Continued)

information providing unit providing, to a corresponding license purchaser, contents information acquired from the shared autonomous device unit.

3 Claims, 5 Drawing Sheets

(58) Field of Classification Search
CPC .... G05D 1/0246; G05D 1/0022; G06N 3/084; G06N 20/00; G06Q 30/0242; G06Q 30/0601; G06V 20/17; G08B 21/22; G08G 1/0967; H04L 63/08; H04L 63/10; H04N 7/181; H04N 7/185; H04N 9/8205; H04W 4/40; H04W 4/50

See application file for complete search history.

(56) References Cited

U.S. PATENT DOCUMENTS

| | | | | |
|---|---|---|---|---|
| 10,165,231 | B2* | 12/2018 | Bostick | G08G 1/096741 |
| 10,237,518 | B2* | 3/2019 | Kuroda | H04N 9/8205 |
| 10,579,060 | B1* | 3/2020 | Santana Li | G08B 25/10 |
| 10,665,155 | B1* | 5/2020 | Rao | G06Q 30/0242 |
| 10,757,376 | B1* | 8/2020 | Yeturu | G06V 20/17 |
| 11,016,504 | B1* | 5/2021 | Konrardy | G01S 19/13 |
| 2005/0057689 | A1* | 3/2005 | Sakagami | H04N 7/181 348/E7.086 |
| 2015/0185034 | A1* | 7/2015 | Abhyanker | G05D 1/0088 701/23 |
| 2015/0242972 | A1* | 8/2015 | Lemmey | G05D 1/0077 705/80 |
| 2016/0116912 | A1* | 4/2016 | Nehmadi | G05D 1/0022 701/2 |
| 2017/0251181 | A1* | 8/2017 | Smolyanskiy | G01C 21/3484 |
| 2019/0205115 | A1* | 7/2019 | Gomes | H04W 4/50 |
| 2019/0215492 | A1* | 7/2019 | Oami | G08B 21/22 |
| 2020/0001868 | A1 | 1/2020 | Lee | |
| 2020/0026294 | A1* | 1/2020 | Kim | G05D 1/0246 |
| 2020/0033845 | A1* | 1/2020 | Park | G05D 1/0055 |
| 2020/0162463 | A1* | 5/2020 | Dykstra | H04L 63/10 |
| 2021/0076008 | A1* | 3/2021 | Seyfi | G05D 1/0094 |
| 2021/0135733 | A1* | 5/2021 | Huang | G06N 3/084 |
| 2021/0331692 | A1* | 10/2021 | Park | H04W 4/40 |
| 2022/0254206 | A1* | 8/2022 | Dykstra | H04L 63/08 |
| 2023/0120276 | A1* | 4/2023 | Lee | G06V 20/58 348/14.05 |

FOREIGN PATENT DOCUMENTS

| | | |
|---|---|---|
| KR | 10-2018-0084345 A | 7/2018 |
| KR | 10-1935695 B1 | 1/2019 |
| KR | 10-2019-0099148 A | 8/2019 |
| KR | 10-2020-0018000 A | 2/2020 |

* cited by examiner

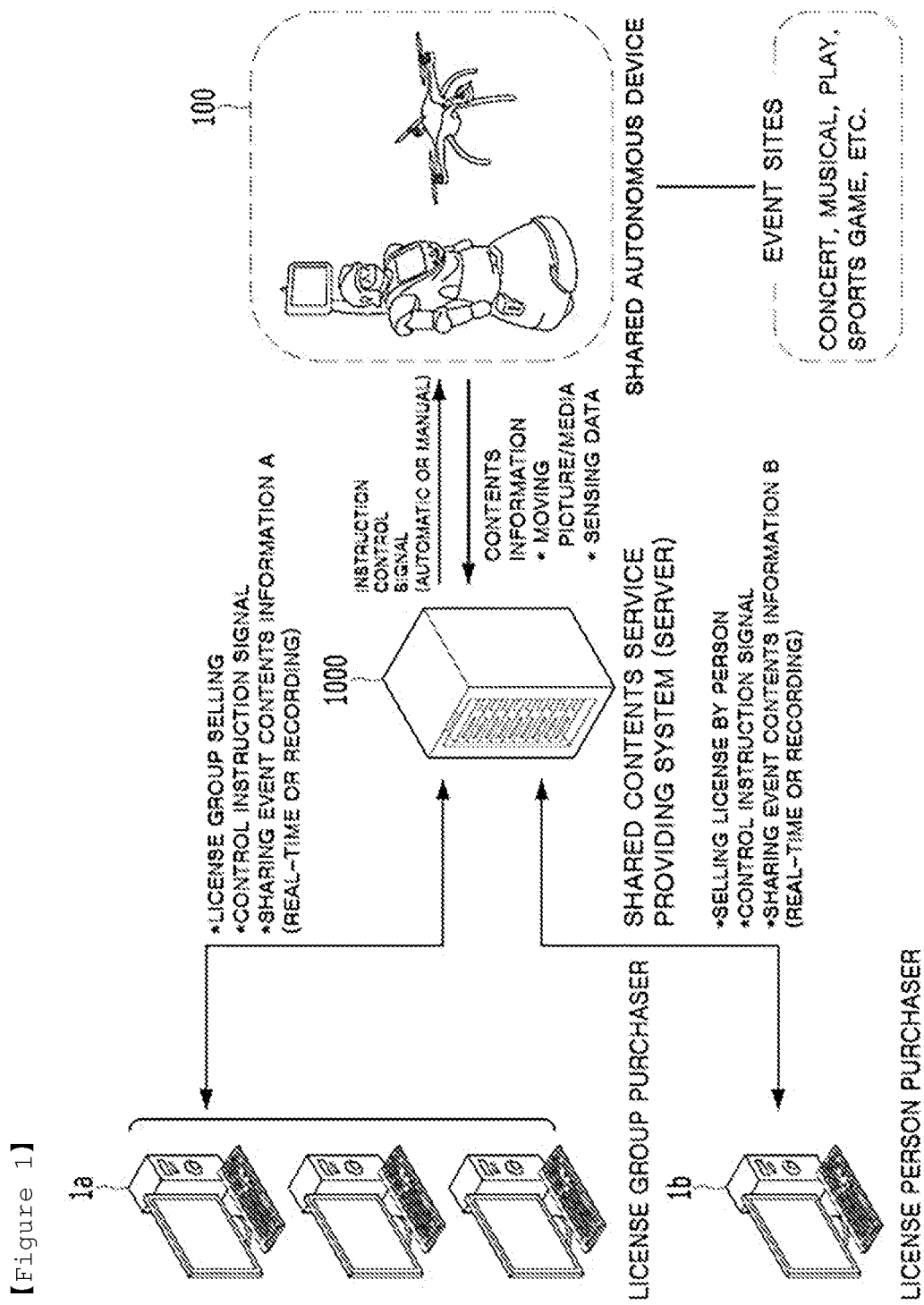
[Figure 1]

【Figure 2】
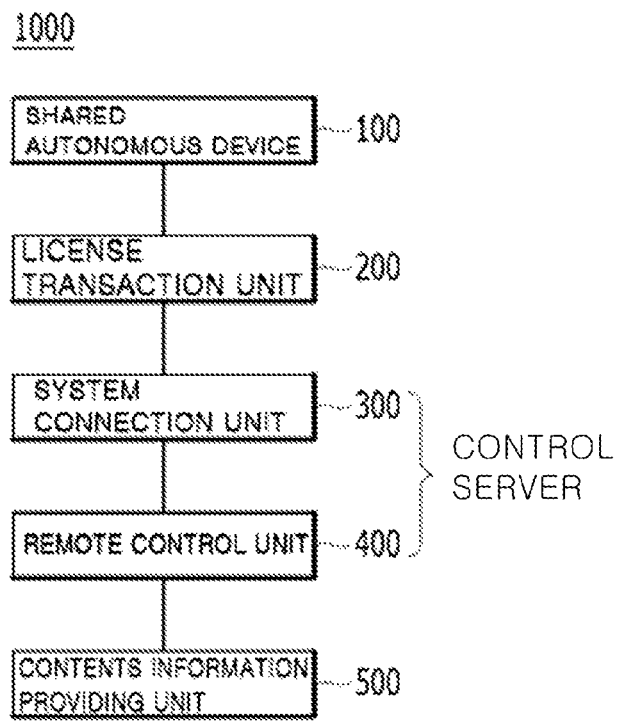
【Figure 3】
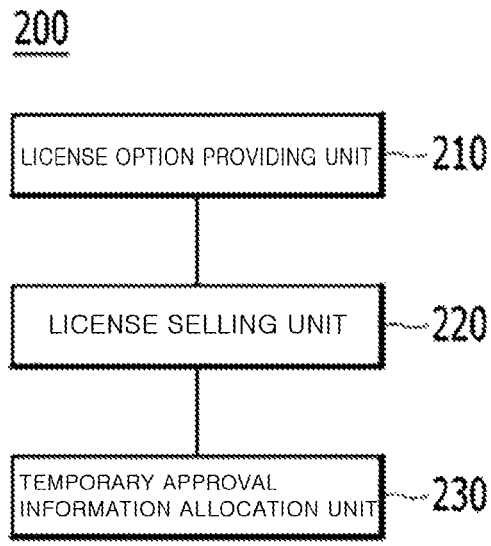

[Figure 4]
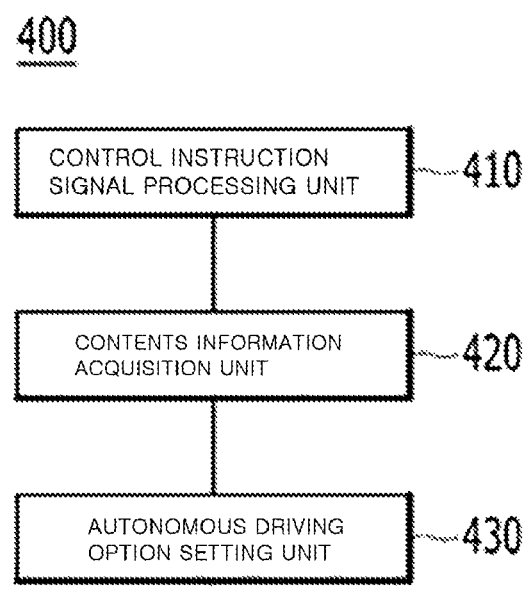

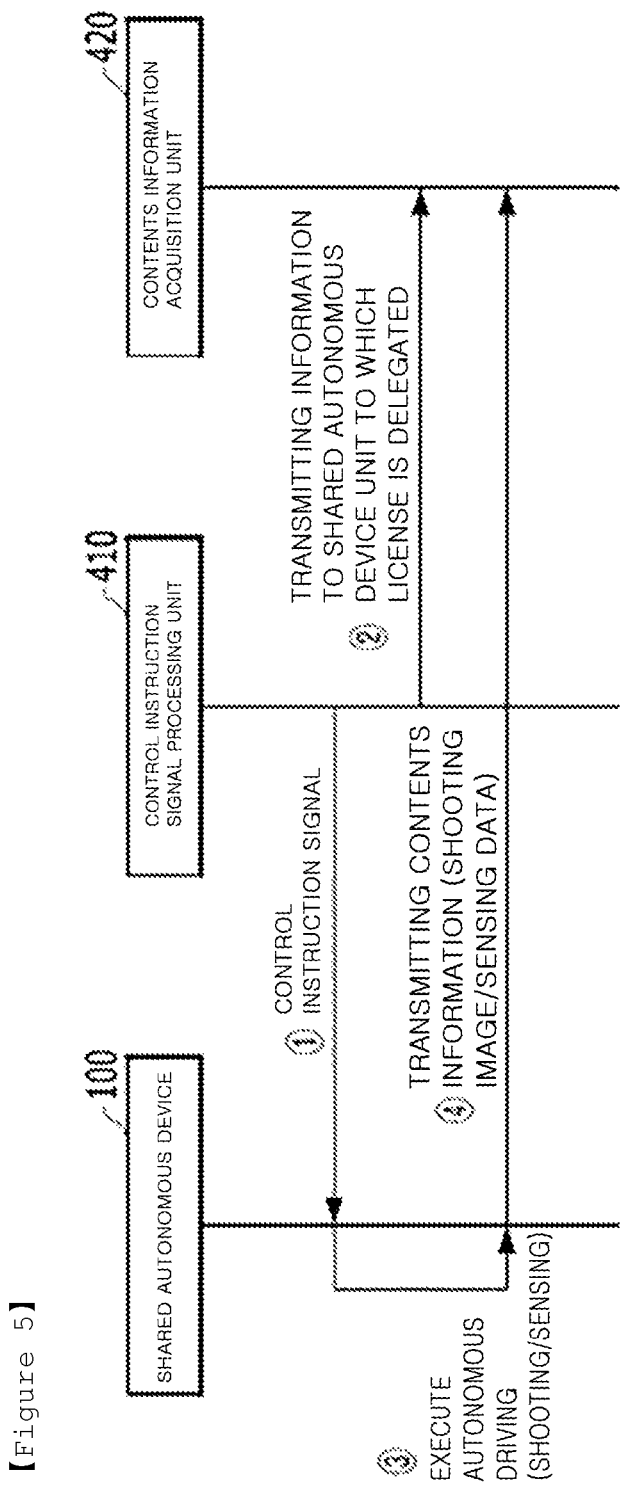

【Figure 6】
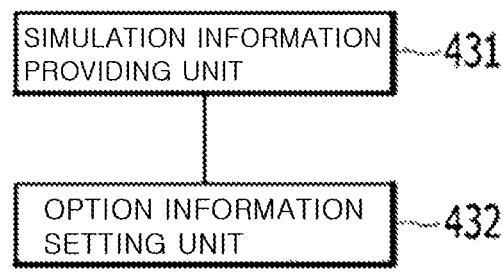
【Figure 7】
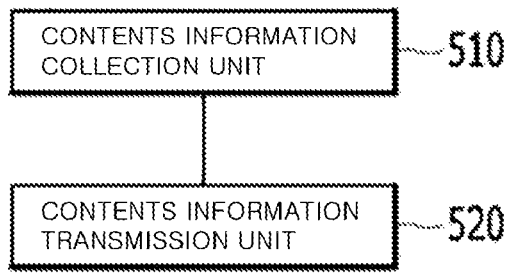

SYSTEM FOR PROVIDING SHARED CONTENTS SERVICE USING REMOTE CONTROLLING OF SHARED AUTONOMOUS DEVICE

TECHNICAL FIELD

An embodiment of the present invention relates to a system for providing a shared contents service using remote controlling of a share autonomous device.

BACKGROUND ART

A drone is a small aircraft that operates without a person on the aircraft, and it performs a specific purpose by receiving a control signal of an administrator remotely. As an example, the drone can take a video by accessing a terrain to which the person cannot go, and provide the taken video to the administrator. Initially, a purpose of using the drone is limited to a military purpose, but now it is possible for general persons to perform broadcast shooting in addition to remote exploration and leisure activities by using the drone currently.

On the other hand, autonomous driving robots must be able to accurately recognize the current own position and move to the target position from the current position recognized from the current location in order to freely move in a predetermined space. To this end, a predetermined landmark is used as a location information providing means that allows the mobile robot to recognize its position. The mobile robot recognizes a landmark installed in a predetermined task space through a video signal processing process for an external video taken a camera to acquire positional information capable of determining a current position thereof with the recognized landmark, and is input into a fixed task space by such a scheme and performs a mission of taking various videos.

As prior technical documents related to the present invention, there are Korean Patent Publication No. 10-1935695 (Registration date: Dec. 28, 2018, Invention Title: A system for transferring control authority using a wireless network) and Korean Laid-open Patent Publication No. 10-2016-0074897 (Publication date: Jun. 29, 2016, Invention Title: The method and apparatus for allowing right of flight of drone).

DISCLOSURE

Technical Problem

An embodiment of the present invention provides a system for providing a shared contents service using remote controlling of a shared autonomous device, which remotely control individuals or multiple users to purchase a temporary license for a driving device such as a drone or a mobile robot, and take a video for a corresponding event site where a specific event is held based on the purchased temporary license, and provides a service to share contents acquired therefrom with the user who purchases the temporary license.

Technical Solution

A system for providing a shared contents service using remote controlling of a shared autonomous device according to an embodiment of the present invention includes: at least one shared autonomous device unit having driving, shooting, sensing and communication functions for at least one of a personal user and multiple users via an Internet communication network; a license transaction unit selling a license for the shared autonomous device unit, and delegating the sold license to a purchaser; a system connection unit processing the system connection of a license purchaser communication terminal to the shared autonomous device unit by using the license delegated through the license transaction unit; a remote control unit receiving a control instruction signal of the shared autonomous device unit from the license purchaser communication terminal remotely connected through the system connection unit, and instructing to execute autonomous driving of the shared autonomous device unit according to the received control instruction signal; and a contents information providing unit providing, to a corresponding license purchaser, contents information acquired from the shared autonomous device unit which is driven and operated according to the control instruction signal.

Further, the license transaction unit may include a license option providing unit providing event site information, and being selected with the shared autonomous device unit for each event site from at least one user communication terminal, a license selling unit selling and processing a license by receiving a license purchase request of the shared autonomous device unit selected by the license option providing unit, and a temporary approval information allocation unit approving an operation authority of the shared autonomous device unit for the license sold and processed through the license selling unit, allocating temporary approval information for system connection, and delegating the license to the license purchaser communication terminal.

Further, the system connection unit may receive the temporary approval information included in the license delegated through the license transaction unit through the dedicated application or website, and allow the license purchaser communication terminal to access the shared contents service providing system according to the temporary approval information, and when there are multiple license purchaser communication terminals, and allow one license purchase communication terminal selected from multiple license purchaser communication terminals to remotely access the shared contents service providing system.

Further, the remote control unit may include a control instruction signal processing unit receiving a control instruction signal of the shared autonomous device unit from the license purchaser communication terminal remotely connected through the system connection unit, transmitting the control instruction signal to the shared autonomous device unit, and controlling to execute autonomous driving of the shared autonomous device unit according to the control instruction signal, and a contents information acquisition unit acquiring at least one contents information of the shooting video and the sensing data from the shared autonomous device unit during the autonomous driving of the shared autonomous device unit.

Further, the remote control unit may further include an autonomous driving option setting unit being set with autonomous driving option information of the shared autonomous device unit including an event site driving line, a shooting pattern, a shooting scheme, and a shooting target based on the license delegated through the license transaction unit.

Further, the autonomous driving option setting unit may include a simulation information providing unit providing at least one simulation information according to an event site driving line, a shooting pattern, and a shooting scheme of a predetermined shared driving device based on event site information, and an option information setting unit being selected with and set the autonomous driving option information of the shared autonomous device unit including the event site driving line, the shooting scheme, and the shooting target of the shared autonomous device unit.

Further, when the shooting target is specified, the automatic control option information setting unit may machine-learn a wearing costume and facial information of the event performer included in the event site information, and provide the machine-learned information to the shared autonomous device unit, and the shared autonomous device unit may recognize and tracks, and shoot the specified shooting target when shooting the event based on the previously machine-learned information provided from the option information setting unit.

Further, the contents information providing unit may include a contents information collection unit collecting contents information acquired form the shared autonomous device unit through the manual remote control unit, and a contents information transmission unit sharing the contents information collected through the contents information collection unit with a personal or multiple purchase communication terminals purchasing the license through the license transaction unit through at least one scheme selected of real-time broadcasting and record broadcasting schemes via an Internet communication network.

Advantageous Effects

According to the present invention, it is possible to provide a system for providing a shared contents service using remote controlling of a shared autonomous device, which remotely control individuals or multiple users to purchase a temporary license for a driving device such as a drone or a mobile robot, and take a video for a corresponding event site where a specific event is held based on the purchased temporary license, and provides a service to share contents acquired therefrom with the user who purchases the temporary license.

DESCRIPTION OF DRAWINGS

FIG. 1 is an overview for describing an overall configuration relationship for a system for providing a shared contents service using remote controlling of a shared autonomous device according to an embodiment of the present invention.

FIG. 2 is a block diagram illustrating an entire configuration of a system for providing a shared contents service using remote controlling of a shared autonomous device according to an embodiment of the present invention.

FIG. 3 is a block diagram illustrating a detailed configuration of a license transaction unit according to an embodiment of the present invention.

FIG. 4 is a block diagram illustrating a detailed configuration of a remote control unit according to an embodiment of the present invention.

FIG. 5 is a flowchart for describing a control instruction procedure between a shared autonomous device and a remote control unit according to an embodiment of the present invention.

FIG. 6 is a block diagram illustrating a detailed configuration of an autonomous driving option setting unit according to an embodiment of the present invention.

FIG. 7 is a block diagram illustrating a detailed configuration of a contents information providing unit according to an embodiment of the present invention.

BEST MODE

FIG. 1 is an overview for describing an overall configuration relationship for a system for providing a shared contents service using remote controlling of a shared autonomous device according to an embodiment of the present invention, FIG. 2 is a block diagram illustrating an entire configuration of a system for providing a shared contents service using remote controlling of a shared autonomous device according to an embodiment of the present invention, FIG. 3 is a block diagram illustrating a detailed configuration of a license transaction unit according to an embodiment of the present invention, FIG. 4 is a block diagram illustrating a detailed configuration of a remote control unit according to an embodiment of the present invention, FIG. 5 is a flowchart for describing a control instruction procedure between a shared autonomous device and a remote control unit according to an embodiment of the present invention, FIG. 6 is a block diagram illustrating a detailed configuration of an autonomous driving option setting unit according to an embodiment of the present invention, and FIG. 7 is a block diagram illustrating a detailed configuration of a contents information providing unit according to an embodiment of the present invention.

Referring to FIG. 1, a system 1000 for providing a shared contents service using remote controlling of a shared autonomous device according to an embodiment of the present invention may be implemented as a web server connected to user communication terminals 1a and 1b via an Internet communication network, an application installed in the user communication terminal, and a website usable in the user communication terminals 1a and 1b, and additionally performed in link with a shared autonomous device unit including driving, photographing, sensing, and communication means. Here, the shared autonomous device unit 100 may include a drone, a mobile robot, etc., and a driving function may include both a driving function by remote controlling and an autonomous driving function. In addition, a shooting function may include a camera device for shooting a video, and a sensing function may include an obstacle sensor, an event sensor, etc., for smooth driving.

The web server may have the same configuration as a general web server in terms of hardware, and include a program module that are implemented through various types of languages including C, C++, Java, Visual Basic, Visual C, etc., and performs various functions in terms of software. Further, the web server may be implemented by using a web server program variously provided according to operating systems including Dos, Windows, Linux, Unix, Macintosh, etc., in hardware for a general server.

Further, the web server is connected to each of the user terminals 1a and 1b, and the shared autonomous device unit 100 through a network, and an example of such a network may include RF, a 3rd Generation Partnership Project (3GPP) network, a Long Term Evolution (LTE) network, a 5th Generation Partnership Project (5GPP) network, a World Interoperability for Microwave Access (WIMAX) network, Internet, a Local Area Network (LAN), Wireless Local Area Network (LAN), a Wide Area Network (WAN), a Personal Area Network (PAN), a Bluetooth network, an NFC network, a satellite broadcasting network, an analog broadcasting network, a Digital Multimedia Broadcasting (DMB) network, etc., but is not limited thereto.

The user communication terminals 1a and 1b may be distinguished into a communication terminal of license group purchasers and a communication terminal 1b of a license personal purchaser, and this is just distinguished according to whether a target which applies for the shared contents service is a personal user or multiple users, and there is no technical difference.

The user communication terminals 1a and 1b may include a general PC in addition to hand-held communication devices including Personal Communication System (PCS), Global System for Mobile Communications (GSM), Personal Digital Cellular (PDC), Personal Handyphone System (PHS), Personal Digital Assistant (PDA), International Mobile Telecommunication (IMT)-2000, Code Division Multiple Access (CDMA)-2000, W-Code Division Multiple Access (W-CDMA), Wireless Broadband Internet (Wibro) terminals, smartphones, smartpads, tablet PCs, etc., and may use the shared contents service according to the embodiment through a dedicated application or a separate website for using the shared contents service.

Referring to FIG. 2, the system 1000 for providing a shared contents service using remote controlling of a shared autonomous device according to an embodiment of the present invention includes at least one of a shared autonomous device unit 100, a license transaction unit 200, a system connection unit 300, a remote control unit 400, an autonomous option setting unit 430, and a contents information providing unit 500.

The shared autonomous device unit 100 may include all devices which may be autonomously (or including a manual scheme) driven (or flown) in addition to the drone and the mobile robot, and the driving function may include both the autonomous driving function (automatic driving) and a driving function (manual driving) by remote controlling. In addition, the shooting function may include a camera device for shooting a video, and a sensing function may include an obstacle sensor, an event sensor, etc., for smooth driving.

The license transaction unit 200 may sell a license for the shared autonomous device unit 100 having each of driving, shooting, sensing, and communication functions to at least one of a personal user and multiple users via the Internet communication network, and delegate the sold license to the purchaser. To this end, the license transaction unit 200 may include a license option providing unit 210, a license purchasing unit 220, and a temporary approval information allocation unit 230.

The license option providing unit 210 may provide event site information, and may be selected with the shared autonomous device unit 100 for each event site from at least one of the user communication terminals 1a and 1b.

For example, a desired event site may be selected by checking event site information related to site events such as a concert, a musical, a play, a sports game, etc., through a website through a dedicated application or a web browser installed in the user communication terminals 1a and 1b, and a required option may be selected before purchasing a temporary license by selecting at least any one of the shared autonomous device unit 100 provided in the selected event site, i.e., the drone or the mobile robot.

The license purchase unit 220 may sell and process the license option providing unit 210 by receiving a temporary license purchase request of the selected shared autonomous device unit 100.

For example, individuals who initially select a license option through the license option providing unit 210 recruit multiple desired persons who want the corresponding option, and when the number of persons who are to be recruited is satisfied or a recruit period arrives, if a license purchase amount of money is satisfied by receiving payment of the purchase amount of money centering on a user who selects an initial license option, purchase processing for the corresponding license to multiple users who pay the corresponding amount of money may be completed or when the individuals select the license option, if the corresponding amount of money is paid, the purchase processing for the corresponding license may be completed.

The temporary approval information allocation unit 230 may approve an operation authority of the shared autonomous device unit 100 for the temporary license of which selling processing is completed through the license selling unit 220, and then allocate temporary approval information for system connection, and delegate the temporary license to the license purchaser communication terminals 1a and 1b.

For example, the temporary approval information for the system connection of the shared autonomous device unit 100 is allocated based on information on the event site and the shared autonomous device unit 100 selected through the license option providing unit 210, and the allocated temporary approval information is delivered to multiple communication terminals 1a purchasing the temporary license to approve an authority capable of operating the shared autonomous device unit 100 in the event site. In this case, temporary approval information delivered to a representative among multiple communication terminals 1a purchasing the temporary license is used for granting the authority to share contents information such as a shooting video, sensing data, etc., acquired from the shared autonomous device unit 100, and used for granting an authority capable of remotely adjusting the shared autonomous device unit 100, and other temporary approval information delivered to multiple communication terminals 1a may be used only for the authority capable of sharing the contents information such as the shooting video, the sensing data, etc., acquired from the shared autonomous device unit 100. That is, the temporary approval information means a temporary authority granted to remotely access the web server or the shared autonomous device unit 100 so as to share the video shot or information sensed by the shared autonomous device unit 100 to all of multiple communication terminals 1a, and means a temporary authority granted to remotely control the operation of the shared autonomous device unit 100 in addition to the former temporary authority to a representative communication terminal 1a. As a result, the representative communication terminal may remotely control the shared autonomous device unit 100 by using the temporary approval information, and receive the contents information acquired from the shared autonomous device unit 100 which is remotely controlled, and other multiple user communication terminals may receive the contents information acquired from the shared autonomous device unit 100 by using the temporary approval information. However, the authority which the representative communication terminal has by using the temporary approval information, i.e., the authority capable of checking the remote controlling and the contents information of the shared autonomous device unit 100 may be granted to the communication terminal 1b of a person who singly purchases the license.

The system connection unit 300 may allow the license purchaser communication terminals 1a and 1b for the shared autonomous device unit 100 to be connected so as to remotely control the shared autonomous device unit 100 by receiving the temporary approval information of the license delegated through the license transaction unit 200 with the dedicated application or the website.

More specifically, the system connection unit 300 receives the temporary approval information included in the license delegated through the license transaction unit 200 through the dedicated application or website, and allows the license purchaser communication terminals 1a and 1b to access the shared contents service providing system 1000 according to the temporary approval information, and when there are multiple license purchaser communication terminals 1a and 1b, it my be possible to remotely control the shared autonomous device unit 100 by allowing the one license purchase communication terminal selected from multiple license purchaser communication terminals 1a and 1b, i.e., the representative communication terminal to remotely access the shared contents service providing system 1000. However, the authority which the representative communication terminal has by using the temporary approval information, i.e., control instruction information (or remote controlling) may be transmitted to the shared autonomous device unit 100, and the contents information may be checked from the shared autonomous device unit 100.

The remote control unit 400 may receive the control instruction information (or real-time remote control signal) of the shared autonomous device unit 100 from the license purchase communication terminals 1a and 1b remotely connected through the system connection unit 300, and instruct autonomous driving of the shared autonomous device unit 100 according to the input control instruction information. To this end, the remote control unit 400 may include a control instruction signal processing unit 410, a content information acquisition unit 420, and an autonomous driving option setting unit 430.

The control instruction signal processing unit 410 may receive the control instruction information of the shared autonomous device unit 100 from the license purchaser communication terminals 1a and 1b connected through the system connection unit 300 via the Internet communication network and the wireless communication device, and control driving and operating of the shared autonomous device unit based on the control instruction information by transmitting the control instruction information to the shared autonomous device unit 100.

For example, the shared autonomous device unit 100 receives a control value for remotely instructing autonomous driving through the user interface provided through the dedicated application or the website of the web browser installed in the license purchaser communication terminals 1a and 1b, converts the control value into the control instruction signal and transmits the control instruction signal to the web server via the Internet communication network, and then, the web server delivers the control instruction signal to the shared autonomous device unit 100 through the wireless communication device to allow a license purchaser to remotely instruct the autonomous driving of the shared autonomous device unit 100, and in this case, receive a feedback for driving information according to the autonomous driving from the shared autonomous device unit 100.

The contents information acquisition unit 420 may acquire at least one contents information of the shooting video and the sensing data from the shared autonomous device unit 100 during the autonomous driving of the shared autonomous device unit 100.

For example, contents information may be acquired, which includes a moving picture photographed while moving or flying in concert, musical, play, and sports game event sites, and data acquired from the shared autonomous device unit 100 and various Internet of Things (IoT) installed in the event site.

The autonomous driving option setting unit 430 is a component for automatically setting autonomous driving information by the shard autonomous device unit 100 according to set information, and being capable of receiving the contents information according to the autonomous driving of the setting value when the corresponding purchaser previously sets various options for shooting.

More specifically, the autonomous driving option setting unit 430 may be set with autonomous driving option information of the shared autonomous device unit 100 including an event site driving line, a shooting pattern, a shooting scheme, and a shooting target based on the license delegated through the license transaction unit 200. To this end, the autonomous driving option setting unit 430 may include a simulation information providing unit 431 and an automatic control option information setting unit 432.

The simulation information providing unit 431 may provide at least one simulation information according to an event site driving line, a shooting pattern, and a shooting scheme of a predetermined shared driving device based on event site information, i.e., an event site scale, an event site structure, an event order, a performer, and weather information.

For example, in the case of the concert, at least one shooting result produced based on information on a structure of a stage, a drivable route inside the event site, a flyable route, a pattern and a scheme of shooting according to the route and the event order, a predicted line (preacquired and input before the event) behind the stage at the time of the event of performers, etc., may be provided as simulation information, and the license purchaser checks the corresponding simulation, and then selects desired simulation information to automatically control the driving and operating of the shared autonomous device unit 100 to be close to the corresponding simulation, thereby acquiring the resulting shooting video.

The automatic control option information setting unit 432 may be selected with and set the autonomous driving option information of the shared autonomous device unit 100 including the event site driving line, the shooting scheme, and the shooting target of the shared autonomous device unit 100. Here, the autonomous driving option information may include at least one shooting result produced based on the information on the structure of the corresponding stage, the drivable path inside the event site, the flyable route, the pattern and the scheme of shooting according to the corresponding route and the event order, the predicted line (preacquired and input before the event) behind the stage during the event of the performers, etc., as the simulation information.

When the shooting target, i.e., the performer is specified, the automatic control option information setting unit 432 may machine-learn a wearing costume and facial information of the event performer included in the event site information in advance, and provide the machine-learned information to the shared autonomous device unit 100.

As a result, the shared autonomous device unit 100 may separately recognize and track the specified shooting target when shooting the event based on the previously machine-learned information provided from the automatic control option information setting unit 432, and more concentratively shoots the corresponding performer to acquire a shooting video in which an appearance weight of the corresponding performer is high. Of course, when the specific shooting target is specified, the shooting weight may be set as a percentage, and in the case of the musical or the play, a speaker may be primarily set, and in the case of the concert, the performer may be set to be found and shot for each song part.

The system connection unit 300 and the remote control unit 400 of the embodiment may be implemented in the form of a separate server, i.e., a control server for total control of the shared autonomous device unit 100. When the control instruction signal processing unit 410 transmits the control instruction signal to the shared autonomous device unit 100 in the control server as illustrated in FIG. 5, for example, (①), the shared autonomous device unit 100 may travel according to the received control instruction signal and acquire the video by shooting according to a set routine, and various sensors may operate and generate various sensing data (③). In this case, the control instruction signal processing unit 410 may transmit identification information for the shared autonomous device unit 100 to which the license is delegated to the contents information acquisition unit 420 while transmitting the control instruction signal to the shared autonomous device unit 100 (②) and the contents information acquisition unit 420 may obtain the contents information such as the shooting image and the sensing data from the shared autonomous device unit 100 (④). Meanwhile, the shared autonomous device unit 100 provides a flight authority grant signal when being set to automatic control, i.e., autonomous driving according to the control instruction signal or delivers an adjustment flight authority grant signal when being set to manual driving to be autonomously driven according to each setting or manually driven by the remote controlling.

The contents information providing unit 500 may provide, to the corresponding license purchaser, the contents information acquired from the shared driving device which is driven and operated according to the remote control information of the remote control unit 400 and/or the autonomous driving option information of the autonomous driving option setting unit 430. To this end, the contents information providing unit 500 may include a contents information collection unit 510 and a contents information transmission unit 520.

The contents information collection unit 510 may collect contents information (moving picture and sensing data) acquired from the shared autonomous device unit 100 which is driven and operated through each of the remote control unit 400 and a brake control unit 400.

The contents information transmission unit 520 may share the contents information collected through the contents information collection unit 510 to individual or multiple purchaser communication terminals 1a and 1b who purchase the temporary license of the shared autonomous device unit 100 via the Internet communication network through at least one scheme among real-time broadcasting and/or record broadcasting schemes.

As an example according to the embodiment, a form in which a user in the United States purchases and leases a license of a sharing robot or a sharing drone positioned in COEX of Seoul for a predetermined time (slot), shoots a show live of a desired singer such as BTS, etc., in a concert place desired thereby remotely, and shares broadcasting in real time and shares a recorded video with other friends in the United States again by accessing a platform according to the embodiment.

The invention claimed is:

1. A system for providing a shared contents service using remote controlling of a shared autonomous device, the system comprising:
   at least one shared autonomous device unit having driving, shooting, sensing and communication functions for at least one of a personal user and multiple users via an Internet communication network;
   a license transaction unit selling a license for the shared autonomous device unit, and delegating the sold license to a purchaser;
   a system connection unit processing the system connection of a license purchaser communication terminal to the shared autonomous device unit by using the license delegated through the license transaction unit;
   a remote control unit receiving a control instruction signal of the shared autonomous device unit from the license purchaser communication terminal remotely connected through the system connection unit, and instructing to execute autonomous driving of the shared autonomous device unit according to the received control instruction signal; and
   a contents information providing unit providing, to a corresponding license purchaser, contents information acquired from the shared autonomous device unit which is driven and operated according to the control instruction signal,
   wherein the remote control unit includes
   a control instruction signal processing unit receiving a control instruction signal of the shared autonomous device unit from the license purchaser communication terminal remotely connected through the system connection unit, transmitting the control instruction signal to the shared autonomous device unit, and controlling to execute autonomous driving of the shared autonomous device unit according to the control instruction signal,
   a contents information acquisition unit acquiring at least one contents information of the shooting video and the sensing data from the shared autonomous device unit during the autonomous driving of the shared autonomous device unit, and
   an autonomous driving option setting unit being set with autonomous driving option information of the shared autonomous device unit including an event site driving line, a shooting pattern, a shooting scheme, and a shooting target based on the license delegated through the license transaction unit, and
   wherein the autonomous driving option setting unit includes
   a simulation information providing unit providing at least one simulation information according to an event site driving line, a shooting pattern, and a shooting scheme of a predetermined shared driving device based on event site information, and
   an option information setting unit being selected with and set the autonomous driving option information of the shared autonomous device unit including the event site driving line, the shooting scheme, and the shooting target of the shared autonomous device unit.

2. The system for providing a shared contents service using remote controlling of a shared autonomous device of claim 1, wherein when the shooting target is specified, the automatic control option information setting unit machine-learns a wearing costume and facial information of the event performer included in the event site information, and provides the machine-learned information to the shared autonomous device unit, and the shared autonomous device unit recognizes and tracks, and shoots the specified shooting target when shooting the event based on the previously machine-learned information provided from the option information setting unit.

3. The system for providing a shared contents service using remote controlling of a shared autonomous device of claim 1, wherein the contents information providing unit comprises a contents information collection unit collecting contents information acquired form the shared autonomous device unit through the manual remote control unit, and a contents information transmission unit sharing the contents information collected through the contents information collection unit with a personal or multiple purchase communication terminals purchasing the license through the license transaction unit through at least one scheme selected of real-time broadcasting and record broadcasting schemes via an Internet communication network.

* * * * *